(12) United States Patent
Ottikkutti et al.

(10) Patent No.: US 10,260,446 B2
(45) Date of Patent: Apr. 16, 2019

(54) METHODS AND SYSTEM FOR AGING COMPENSATION OF A FUEL SYSTEM

(71) Applicant: General Electric Company, Schenectady, NY (US)

(72) Inventors: Pradheepram Ottikkutti, Erie, PA (US); Bharath Chandrashekar, Bangalore (IN); Shailesh Nair, Bangalore (IN); Jeffrey David Willis, Harborcreek, PA (US)

(73) Assignee: GE Global Sourcing LLC, Norwalk, CT (US)

( * ) Notice: Subject to any disclaimer, the term of this patent is extended or adjusted under 35 U.S.C. 154(b) by 266 days.

(21) Appl. No.: 15/215,620

(22) Filed: Jul. 21, 2016

(65) Prior Publication Data

US 2018/0023501 A1 Jan. 25, 2018

(51) Int. Cl.
*F02D 41/38* (2006.01)
*F02M 59/46* (2006.01)
(Continued)

(52) U.S. Cl.
CPC ..... *F02D 41/3845* (2013.01); *F02D 41/2438* (2013.01); *F02M 55/025* (2013.01); *F02M 59/466* (2013.01); *F16K 37/0083* (2013.01); *F02D 41/123* (2013.01); *F02D 2041/2058* (2013.01); *F02D 2041/224* (2013.01); *F02D 2200/0602* (2013.01)

(58) Field of Classification Search
CPC .. F02M 59/336; F02M 59/367; F02M 59/368; F02M 59/46; F02M 59/466; F02M 63/024; F02D 7/02; F02D 2041/224; F02D 2041/228; F02D 2200/0602; F02D 2250/31; F16K 37/0075; F16K 37/0083
USPC ........ 123/456–459, 510, 511; 701/104, 29.1, 701/29.2; 73/114.38, 114.43
See application file for complete search history.

(56) References Cited

U.S. PATENT DOCUMENTS 5,445,019 A 8/1995 Glidewell et al.
8,857,412 B2 * 10/2014 Nistler .................... F02D 41/22
123/198 D
(Continued)

FOREIGN PATENT DOCUMENTS

EP 1643111 A1 4/2006

*Primary Examiner* — Erick R Solis
*Assistant Examiner* — Robert A Werner
(74) *Attorney, Agent, or Firm* — McCoy Russell LLP (57) ABSTRACT

Various methods and systems are provided for health assessments of a fuel system. In one example, a fuel system includes a low-pressure pump operable to pump fuel from a fuel source at a first pressure, a high-pressure pump operable to increase the first pressure to a second pressure, a valve positioned between the low-pressure pump and the high-pressure pump and operable to control fuel flow to the high-pressure pump, a common fuel rail fluidly coupling the high-pressure pump to a plurality of fuel injectors coupled to cylinders of an engine, and a controller. The controller is operable to adjust an amount of valve electrical current supplied to the valve to reach a commanded pressure of the common fuel rail during cylinder firing conditions, the supplied valve electrical current adjusted based on a valve pre-firing correction factor for the valve obtained based on valve electrical current prior to cylinder firing commencing.

17 Claims, 5 Drawing Sheets

(51) Int. Cl.
   *F02M 55/02*   (2006.01)
   *F16K 37/00*   (2006.01)
   *F02D 41/24*   (2006.01)
   *F02D 41/12*   (2006.01)
   *F02D 41/20*   (2006.01)
   *F02D 41/22*   (2006.01)

(56) References Cited

U.S. PATENT DOCUMENTS

| | | | | |
|---|---|---|---|---|
| 2005/0092301 | A1* | 5/2005 | Fukuda | F02M 59/366 |
| | | | | 123/446 |
| 2006/0130813 | A1* | 6/2006 | Dolker | F02D 41/3854 |
| | | | | 123/458 |
| 2009/0150046 | A1* | 6/2009 | Achleitner | F02D 41/22 |
| | | | | 701/103 |
| 2009/0299606 | A1* | 12/2009 | Dintino | F02D 41/2464 |
| | | | | 701/103 |
| 2010/0237266 | A1* | 9/2010 | Haaf | F02D 41/20 |
| | | | | 251/129.15 |
| 2013/0013174 | A1* | 1/2013 | Nistler | F02D 41/123 |
| | | | | 701/112 |
| 2013/0013175 | A1* | 1/2013 | Nistler | F02D 41/22 |
| | | | | 701/112 |
| 2016/0084190 | A1* | 3/2016 | Nistler | F02D 41/3845 |
| | | | | 123/456 |

\* cited by examiner

METHODS AND SYSTEM FOR AGING COMPENSATION OF A FUEL SYSTEM

BACKGROUND

Technical Field

Embodiments of the subject matter disclosed herein relate to a fuel system for an engine.

Discussion of Art

Vehicles, such as rail vehicles, include power sources, such as diesel engines. In some vehicles, fuel is provided to the diesel engine by a common rail fuel system. One type of common rail fuel system comprises a low-pressure fuel pump in fluid communication with a high-pressure fuel pump, and a fuel rail in fluid communication with the high-pressure fuel pump and further in fluid communication with at least one engine cylinder. The high-pressure fuel pump pressurizes fuel for delivery through the fuel rail. Fuel travels through the fuel rail to at least one fuel injector, and ultimately to at least one engine cylinder of the power source such as an engine where fuel is combusted to provide power to the vehicle.

In order to reduce the likelihood of engine degradation, the common rail fuel system may be monitored for fuel leaks. However, typical fuel system leak tests do not account for normal aging of the fuel system components, increasing the likelihood a false positive leak test will occur. False positive leak tests may result in unnecessary engine shutdowns, leading to operator frustration and increasing maintenance costs.

BRIEF DESCRIPTION

In one embodiment, a fuel system includes a low-pressure fuel pump operable to pump fuel from a fuel source at a first pressure, a high-pressure fuel pump operable to increase the first pressure to a second pressure, a valve positioned between the low-pressure fuel pump and the high-pressure fuel pump, the valve being operable to control fuel flow to the high-pressure fuel pump, a common fuel rail fluidly coupling the high-pressure fuel pump to a plurality of fuel injectors that is operable to inject fuel to cylinders of an engine, and a controller. The controller is operable to adjust an amount of electrical current supplied to the valve to reach a commanded pressure of the common fuel rail during cylinder firing conditions, the supplied electrical current adjusted based on a valve pre-firing correction factor for the valve obtained based on electrical current supplied to the valve prior to cylinder firing commencing.

In this way, a valve pre-firing correction factor may be determined prior to cylinder firing of an engine. The valve pre-firing correction factor may be indicative of age of the valve positioned between the low-pressure fuel pump and the high-pressure fuel pump, and/or indicative of age of the high-pressure fuel pump. By adjusting electrical current supplied to the valve based on the valve pre-firing correction factor, a rail pressure of the common fuel rail may be maintained at a commanded rail pressure even as the valve and/or pump ages, thus maintaining tight control over rail pressure and increasing fuel economy and/or reducing emissions. Further, during a fuel system leak test where the amount of electric current supplied to the valve to reach a predetermined rail pressure is monitored, the threshold electrical current for indicating a leak may be adjusted based on the valve pre-firing correction factor to account for variances in the valve and/or pump function as the valve and/or pump age, reducing the likelihood that a false positive leak test will occur.

DETAILED DESCRIPTION

Figure 1:
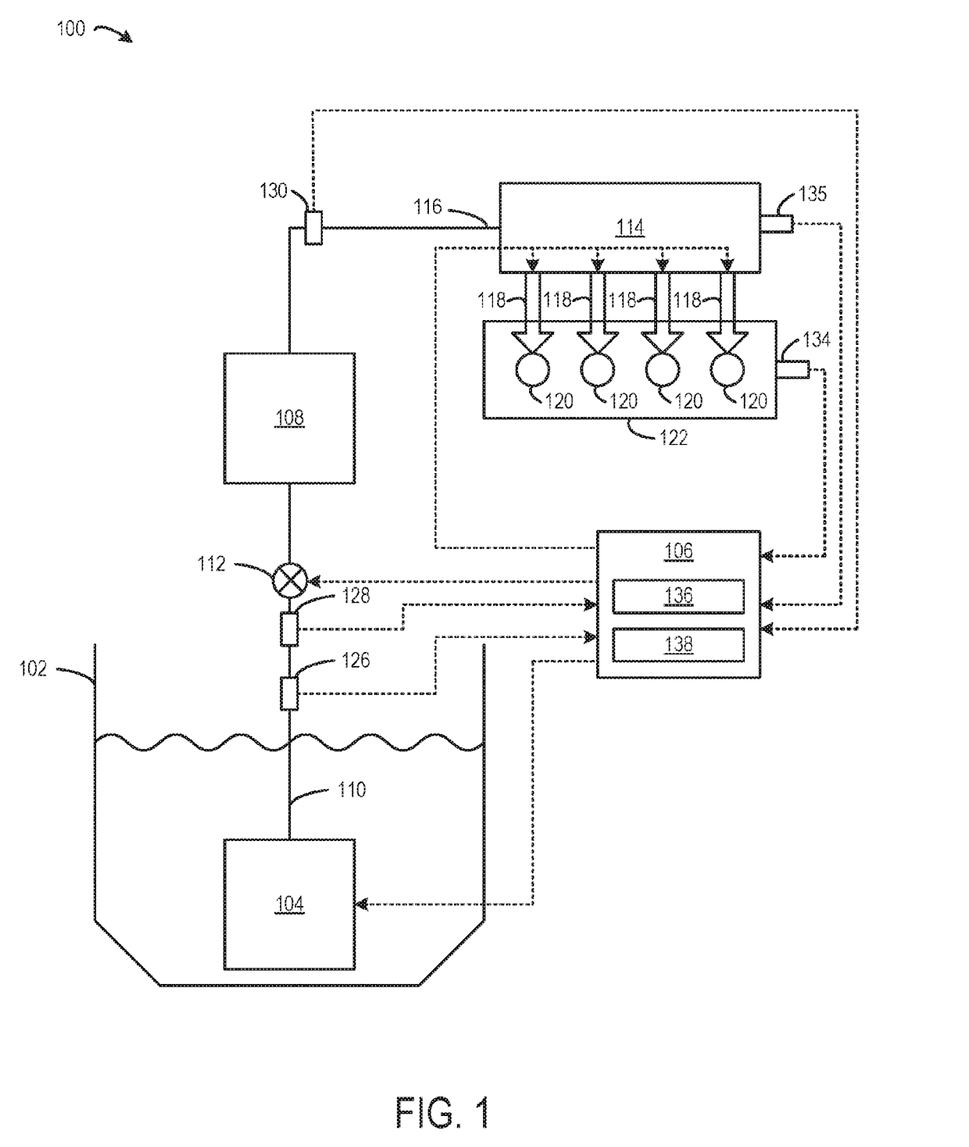
FIG. 1 schematically shows an embodiment of a common rail fuel system of the present disclosure.

The present description relates to vehicles, such as rail vehicles, that include an engine (such as a diesel engine) where fuel is provided to the engine through a common rail fuel system (CRS). As shown in FIG. 1, a CRS includes a common fuel rail that provides fuel to a plurality of fuel injectors for fuel injection into cylinders of the engine. In one example, the CRS includes an inlet metering valve (IMV) that is positioned between a low-pressure fuel pump and a high-pressure fuel pump. The IMV is operable to control fuel flow to the high-pressure fuel pump that supplies the common fuel rail with high pressure fuel. An amount of electrical current supplied to the IMV can be adjusted to vary a position of the IMV and hence vary an amount of fuel provided to the common fuel rail as operation conditions change.

Figure 5:
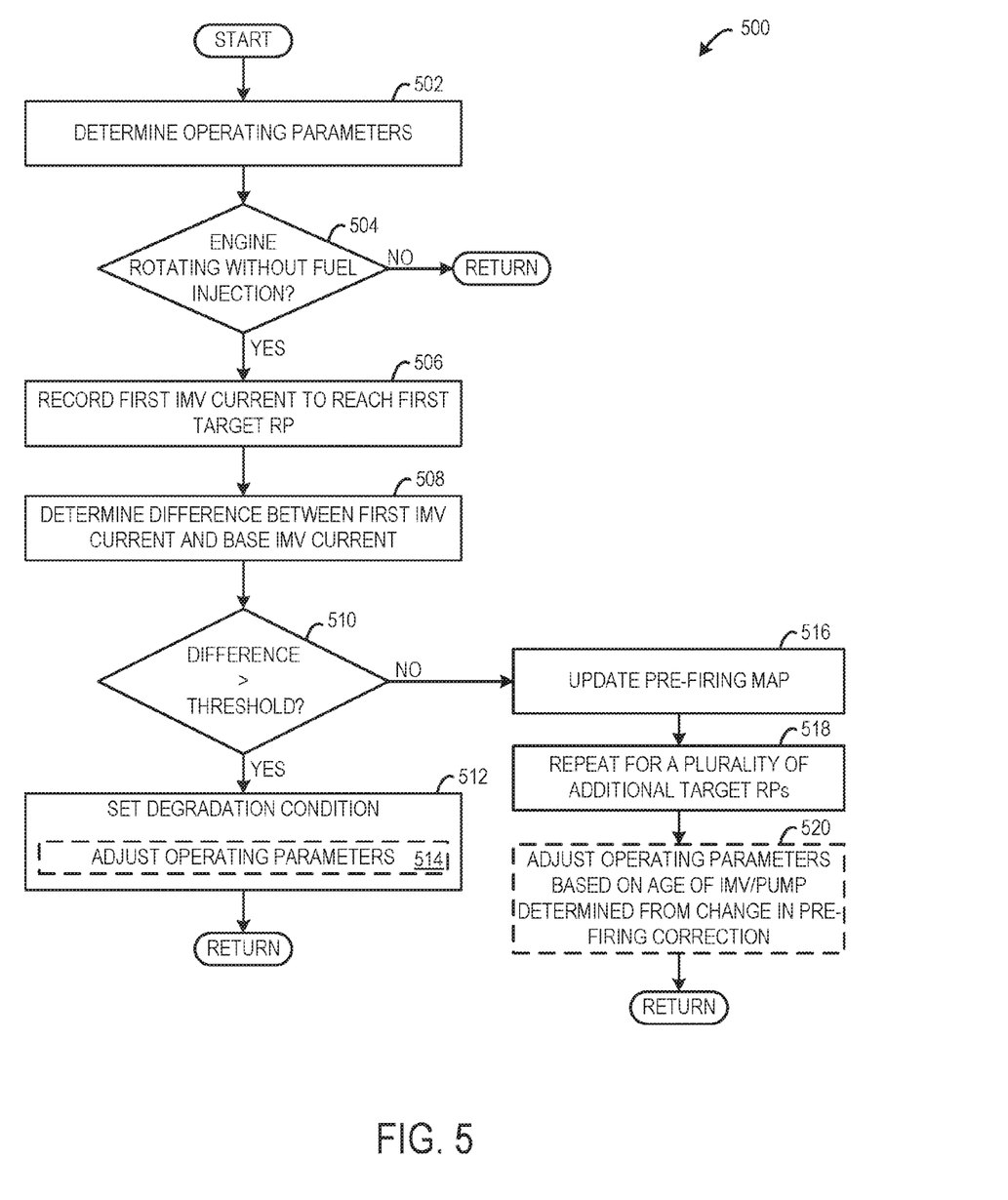
FIG. 5 is a flow chart illustrating an embodiment of a method for determining a valve pre-firing correction factor.
Figure 6:
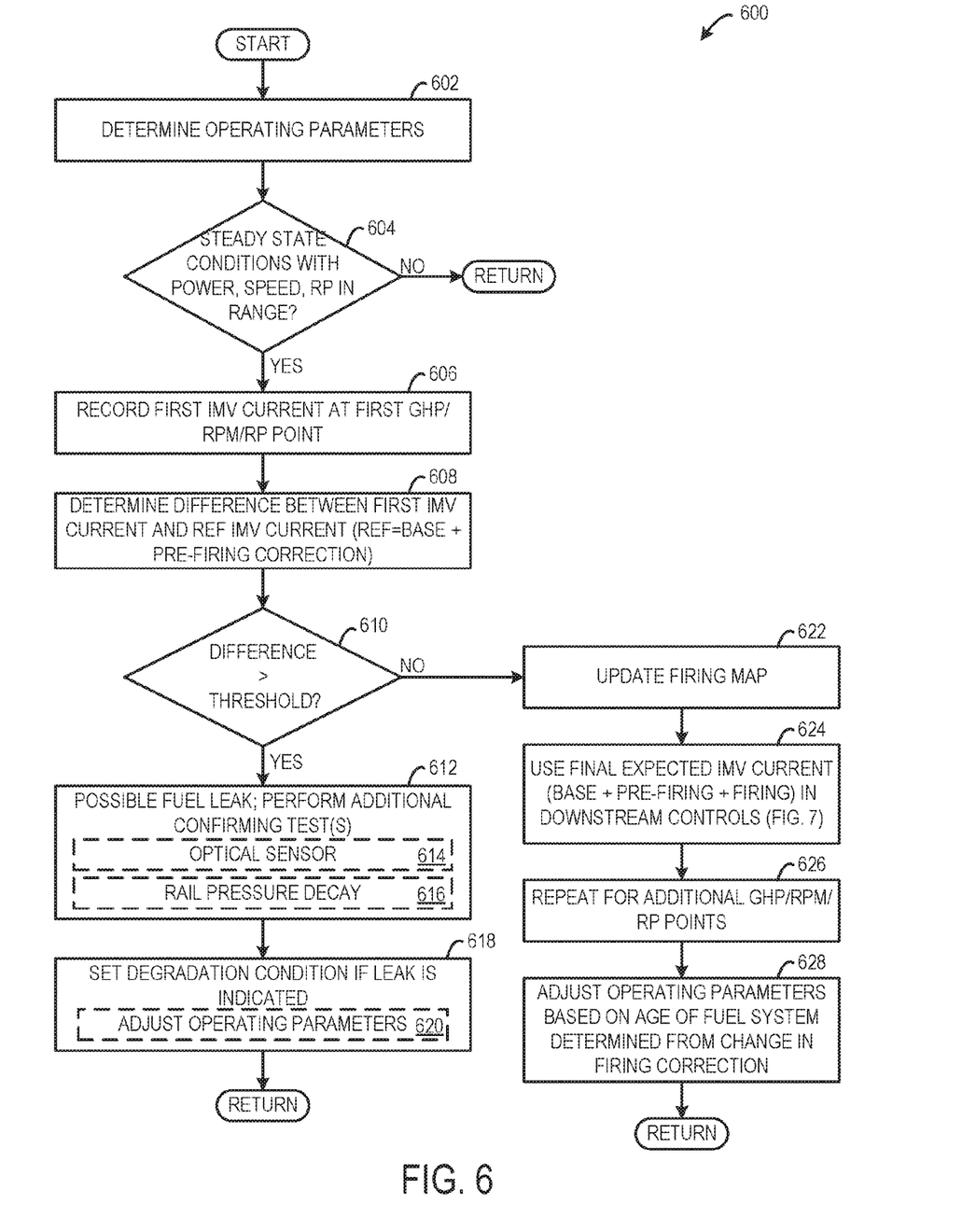
FIG. 6 is a flow chart illustrating an embodiment of a method for determining a valve firing correction factor.
Figure 7:
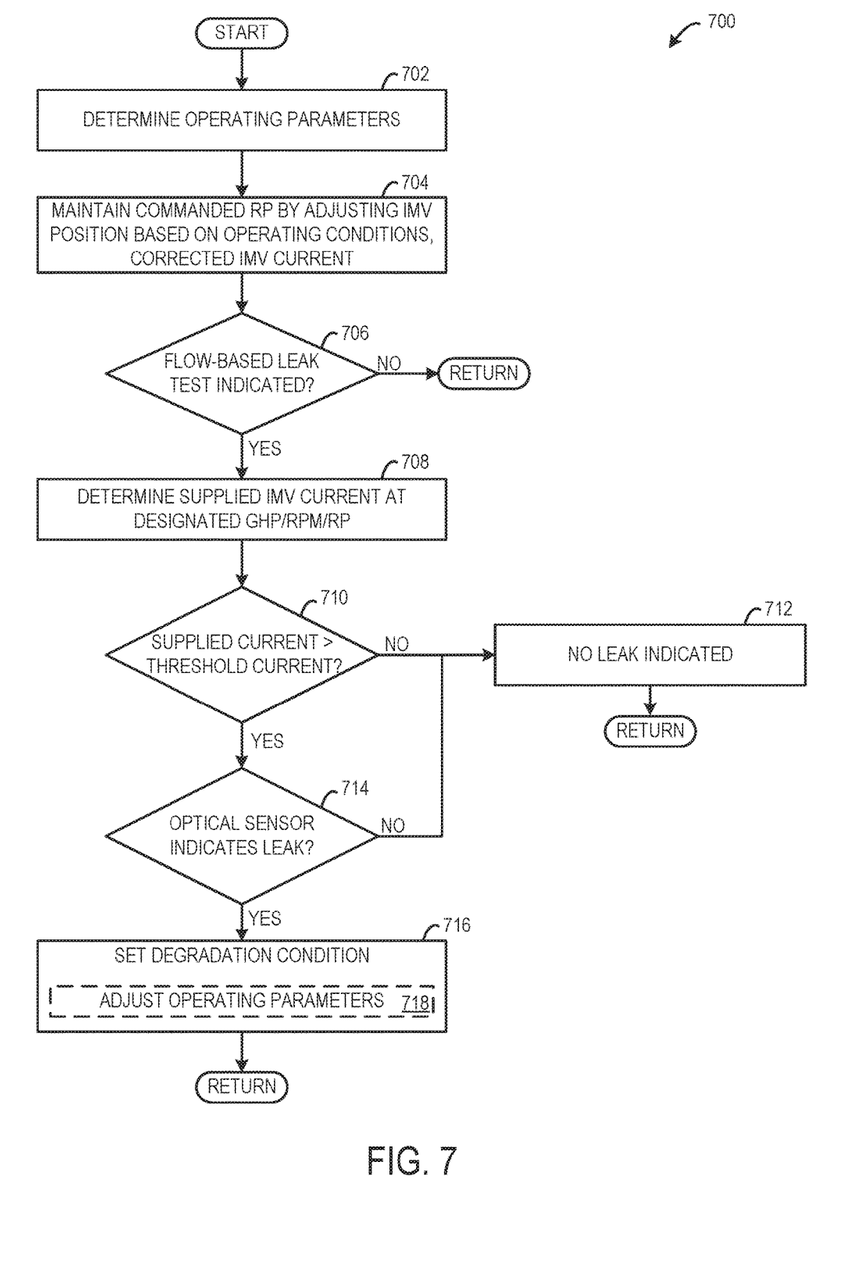
FIG. 7 is a flow chart illustrating an embodiment of a method for operating a common rail fuel system based on the valve pre-firing correction factor and the valve firing correction factor.

Fuel system characteristic maps (e.g., electrical current applied to achieve a given IMV position) may be used to diagnose fuel system component degradation in addition to controlling rail pressure of the common fuel rail. However, these maps are typically compiled based on new components in test situations and as such do not account for normal aging of the components. A fuel system control routine, as shown by the control diagram of FIG. 2, may be performed to assess the aging of the components and adjust the fuel system characteristic maps accordingly, such as the characteristic maps illustrated in FIGS. 3 and 4. The control routine may include a two-step component aging assessment, with the first step performed before an engine start in order to determine a pre-firing correction factor indicative of an age of the IMV and/or high-pressure fuel pump, and update a pre-firing characteristic map based on the age, as shown by the method of FIG. 5. The second step of the assessment is performed after the engine start in order to determine a firing correction factor indicative of the age of the fuel injectors, and update a firing characteristic map, as shown by the method of FIG. 6. The pre-firing and firing correction factors/characteristic maps may be used to control rail pressure and as thresholds for indicating fuel system leaks or other changes in performance, as shown by the method of FIG. 7. Further, aging of the IMV or the injectors may be indicated when the pre-firing correction and/or firing correction shows an increasing trend. Based on the age of the IMV or fuel injectors, a trigger for or a delay to perform preventative maintenance may be generated.

FIG. 1 includes a block diagram of a CRS 100 for an engine of a vehicle, such as a rail vehicle. In one example, the rail vehicle is a locomotive. In alternative embodiments, the engine may be in another type of off-highway vehicle, on-highway vehicle, stationary power plant, marine vessel, or others. Liquid fuel is sourced or stored in a fuel tank 102. A low-pressure fuel pump 104 is in fluid communication with the fuel tank 102. In this embodiment, the low-pressure fuel pump 104 is disposed inside of the fuel tank 102 and can be immersed below the liquid fuel level. In alternative embodiments, the low-pressure fuel pump may be coupled to the outside of the fuel tank and pump fuel through a suction device. Operation of the low-pressure fuel pump 104 is regulated by a controller 106. The low pressure fuel pump 104 may be any one of engine gear driven or independent electrically driven.

Liquid fuel is pumped by the low-pressure fuel pump 104 from the fuel tank 102 to a high-pressure fuel pump 108 through a conduit 110. A valve 112 is disposed in the conduit 110 and regulates fuel flow through the conduit 110. For example, the valve 112 is an inlet metering valve. The IMV 112 is disposed upstream of the high-pressure fuel pump 108 to adjust a flow rate of fuel that is provided to the high-pressure fuel pump 108 and further to a common fuel rail 114 for distribution to a plurality of fuel injectors 118 for fuel injection into the engine cylinders. For example, the IMV 112 may be a solenoid valve, opening and closing of which is regulated by the controller 106. In other words, the controller 106 commands the IMV to be fully closed, fully open, or a position in between fully closed and fully opened in order to control fuel flow to the high-pressure fuel pump 108 to a commanded fuel flow rate. During operation of the vehicle, the IMV 112 is adjusted to meter fuel based on operating conditions, and during at least some conditions may be at least partially open. It is to be understood that the valve is merely one example of a control device for metering fuel and any suitable control element may be employed without departing from the scope of this disclosure. For example, a position or state of the IMV may be electrically controlled by controlling an IMV electrical current. As another example, a position or state of the IMV may be mechanically controlled by controlling a servo motor that adjusts the IMV.

The high-pressure fuel pump 108 increases fuel pressure from a lower pressure to a higher pressure. The high-pressure fuel pump 108 is fluidly coupled with the common fuel rail 114. The high-pressure fuel pump 108 delivers fuel to the common fuel rail 114 through a conduit 116. A plurality of fuel injectors 118 are in fluid communication with the common fuel rail 114. Each of the plurality of fuel injectors 118 delivers fuel to one of a plurality of engine cylinders 120 in an engine 122. Fuel is combusted in the plurality of engine cylinders 120 to provide power to the vehicle through an alternator and traction motors, for example. Operation of the plurality of fuel injectors 118 is regulated by the controller 106. In the embodiment of FIG. 1, the engine 122 includes four fuel injectors and four engine cylinders. In alternate embodiments, more or fewer fuel injectors and engine cylinders can be included in the engine.

In some implementations, the common fuel rail is a single-walled fuel rail. The CRS also may include single-walled conduits (e.g., conduit 116 could be single-walled) for delivering fuel to the fuel rail. The single-walled configuration may be employed to reduce production costs as well as to reduce weight of the CRS, relative to a double-walled configuration.

Fuel pumped from the fuel tank 102 to an inlet of the IMV 112 by the low-pressure fuel pump 104 may operate at what is referred to as a lower fuel pressure or supply fuel pressure. Correspondingly, components of the CRS 100 which are upstream of the high-pressure fuel pump 108 operate in a lower fuel pressure or engine fuel pressure region. On the other hand, the high-pressure fuel pump 108 may pump fuel from the lower fuel pressure to a higher fuel pressure or rail fuel pressure. Correspondingly, components of the CRS 100 which are downstream of the high-pressure fuel pump 108 are in a higher-fuel pressure or rail fuel pressure region of the CRS 100.

A fuel pressure in the lower fuel pressure region is measured by a pressure sensor 126 that is positioned in the conduit 110. The pressure sensor 126 sends a pressure signal to the controller 106. In an alternative application, the pressure sensor 126 is in fluid communication with an outlet of the low-pressure fuel pump 104. A fuel temperature in the lower fuel pressure region is measured by a temperature sensor 128 that is positioned in conduit 110. The temperature sensor 128 sends a temperature signal to the controller 106.

A fuel pressure in the higher fuel pressure region is measured by a pressure sensor 130 that is positioned in the conduit 116. The pressure sensor 130 sends a pressure signal to the controller 106. In an alternative application, the pressure sensor 130 is in fluid communication with an outlet of the high-pressure fuel pump 108. Note that in some applications various operating parameters may be generally determined or derived indirectly in addition to or as opposed to being measured directly. In some examples, one or more optical sensors 135 may be present to optically measure fuel flow. The optical sensor may be positioned such that any leak in the system is collected from all possible locations in the high pressure system and channeled through one fuel hose/pipe to pass through the optical sensor before returning back to fuel tank. However, such a leak detection system may detect leaks due to degradation of sealing joints between the fuel lines and mating injectors/pumps and may not detect natural/internal leakages that will exist from high pressure pump and injector operation.

As shown, the optical sensor is positioned near the common fuel rail; however, other locations are possible, such as on a side of the engine. Further, the optical sensor may be positioned at a collection tank positioned on a side of the engine or at the common fuel rail. This collection tank may include a cut-off valve at the exit of the tank, such that all fuel leakage from the fuel rail is collected, and once a total volume of fuel fills the tank to the optical sensor, that sensor is tripped and determines there is a fuel leak. In another example, a small orifice may be in the bottom of the tank, such that a minimum continuous leak rate will fill the tank to the sensor. Alternatively or additionally, a float sensor or pressure sensor in the collection tank may be used to detect a leak. Alternatively, the tank may be dispensed with and a flow meter may instead detect fuel leaks via fuel flow through the hose/pipe.

In addition to the sensors mentioned above, the controller 106 receives various signals from a plurality of engine sensors 134 coupled to the engine 122 that may be used for assessment of fuel control health and associated engine operation. For example, the controller 106 receives sensor signals indicative of air-fuel ratio, engine speed, engine load, engine temperature, ambient temperature, fuel value, a number of cylinders actively combusting fuel, etc. In the illustrated implementation, the controller 106 is a computing device, such as microcomputer that includes a processor unit 136, non-transitory computer-readable storage medium device 138, input/output ports, memory, and a data bus. Computer-readable storage medium 138 included in the controller 106 is programmable with computer readable data representing instructions executable by the processor for performing the control routines and methods described below as well as other variants that are not specifically listed.

The controller 106 is operable to adjust various actuators in the CRS 100 based on different operating parameters received or derived from different signals received from the various sensors, to dynamically assess the health of the CRS and control operation of the engine based on the assessment. For example, in an embodiment, the controller 106 is operable to perform a health check diagnostic that is performed continually to protect the engine during operation. The health check diagnostic leverages operational knowledge of the IMV to detect a gross fuel leak or other degradation. In particular, it is understood that the IMV is a normally open device during engine operation. Thus, it can be assumed that if the actual IMV position (or an electrical current indicative of position) is different from a predicted IMV position (or an electrical current indicative of position), then an excess flow of fuel is being provided to the common fuel rail. Furthermore, assuming that the fuel pressure downstream of the high-pressure pump and in the common fuel rail is regulated to a desired pressure (e.g., substantially constant), then it can be assumed that excess fuel flow is exiting the common fuel rail other than through commanded fuel injection. This excess fuel flow could represent either a leak in the CRS or another degradation of the CRS due to increased internal leakage flow resulting from wear of one or more of the individual components such as IMV, high pressure pump, or one or more injectors.

The controller 106 is operable to perform the continuous health check diagnosis by determining a predicted IMV position that is based on a predicted IMV electrical current. The predicted IMV electrical current is derived from a fuel system characteristic map that outputs IMV electrical current for reaching a given rail pressure, and as a function of operating conditions (e.g., engine speed and output). Further, the controller 106 is operable to determine an actual IMV position that is based on an actual IMV electrical current. For example, the actual IMV electrical current is provided by the controller 106 to the IMV 112 to control a valve position. The controller 106 is operable to determine a difference between the predicted IMV electrical current and the actual IMV electrical current. If the difference is greater than a threshold, the controller 106 is operable to set a degradation condition. The threshold may be set to a suitable value and may be calibrated to suit different CRS configurations. In some embodiments, the threshold is adjusted based on aging of the fuel system components. Adjustment of the threshold will be discussed in further detail below with reference to FIGS. 5 and 6.

In some implementations, the degradation condition may include shutting down the engine 122. By shutting down the engine in response to detection of a fuel leak, the likelihood of engine degradation, degraded operability, or the like may be reduced. In some implementations, the degradation condition may include setting a diagnostic flag and presenting an indication (e.g., visual or audio) of the degradation condition to an operator. Further, certain types of degradation, such as a worn high-pressure fuel pump, may be accounted for by adjustment of engine operating parameters (e.g., opening the IMV more than a predetermined amount for maintaining rail pressure, engine deration) in order to prevent an engine shutdown that could potentially result in an undesirable road degradation of the vehicle.

As another example of a dynamic assessment of the CRS, the controller 106 is operable to update the fuel system characteristic maps as components of the CRS age. As explained above, the fuel system characteristic maps may plot IMV electrical current as a function of rail pressure and system operating parameters. The fuel system characteristic maps may include a first, pre-firing map that plots IMV electrical current as a function of rail pressure during conditions where fuel injection is not occurring. The fuel system characteristic maps may also include a second, firing map that plots IMV electrical current as a function of rail pressure and engine conditions (e.g., engine speed and engine power) during steady state conditions where fuel injection is occurring. The controller 106 is operable to adjust the fuel system characteristic maps over time to account for aging of the fuel system components.

In particular, the controller 106 is operable to adjust the first, pre-firing map during a no-load condition of the engine when fuel injection by the plurality of fuel injectors 118 is not occurring. A no-load condition of the engine occurs when the engine is rotated by inertia or an external torque generated from outside of the engine. As one example, a no-load condition occurs during engine startup when a cranking motor turns the engine. The turning engine drives the fuel pumps to pressurize the common fuel rail. As another example, a no-load condition occurs when a motor/generator powers the engine. As yet another example, a no-load condition occurs when the engine absorbs torque or creates negative torque, such as during a coast down event. A coast down event occurs when an engine is operating at speed and the demanded engine load becomes zero (or no-load) and the engine is rotated by inertia until external resistance slows the engine speed to a designated speed or the demanded engine load increases. Stated another way, a no-load condition of the engine is a condition where fuel injection is not necessary to meet an engine load. The pre-firing map update is performed during no-load conditions of the engine so that fuel injection can be stopped without interfering with engine operation.

Once fuel injection is stopped (or during engine start conditions, before fuel injection commences), the controller 106 is operable to sweep the IMV through a plurality of positions to reach a plurality of different rail pressures of the common fuel rail. At each given rail pressure, the electrical current supplied to the IMV to reach the given rail pressure is determined and compared to the electrical current at that rail pressure in the pre-firing map. If the supplied electrical current is different than the electrical current for that rail pressure in the pre-firing map, the map may be updated to include the supplied electrical current. Further, in some examples, if the difference between the supplied electrical current and the electrical current in the map is greater than a threshold, it may indicate a change in performance (e.g., degradation) of the IMV or high-pressure fuel pump.

The controller 106 is operable to adjust the second, firing map during engine operation when fuel injection by the plurality of fuel injectors 118 is occurring. Once fuel injection commences and the engine reaches steady state conditions (e.g., where engine speed and engine power are not changing), the controller 106 is operable to command the system to operate at a plurality of operating points. Each operating point includes a given rail pressure, engine speed, and engine power (as measured in gross horsepower or as determined based on a notched throttle position). At each given operating point, the electrical current supplied to the IMV to reach the rail pressure at that operating point is determined and compared to the electrical current at that operating point in the firing map. If the supplied electrical current is different than the electrical current for that operating point in the firing map, the map may be updated to include the supplied electrical current. Further, in some examples, if the difference between the supplied electrical current and the electrical current in the map is greater than a threshold, it may indicate a change in performance (e.g., degradation) of the fuel injection system (e.g., one of the fuel injectors may suffer from wear, resulting in reduced function or stopped injection).

In some embodiments, the controller 106 is operable to check that operating conditions are suitable prior to updating the fuel system characteristic maps. For example, the controller 106 is operable to check that the low-pressure fuel pump 104 is pumping fuel to the common fuel rail 114 so that there is enough fuel pressure built up to reach the commanded rail pressures. Correspondingly, the controller 106 is operable to check that the engine 122 is operating in a designated engine speed range where the engine is cranking to operate the fuel pump. Further, the controller 106 is operable, during updating of the firing map, to only monitor IMV electrical current when certain engine operating conditions are within range, e.g., engine speed is within a predetermined speed range, engine power is within a predetermined range, and rail pressure is within a predetermined range.

Figure 2:
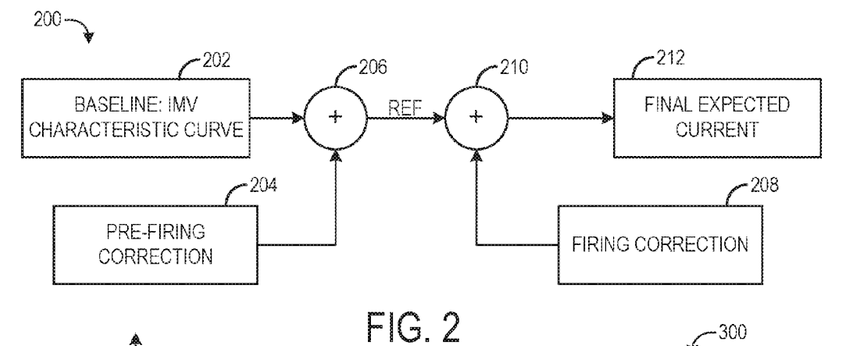
FIG. 2 schematically shows an example control diagram for an adaptive control of the common rail fuel system of the present disclosure.

FIG. 2 is a control diagram 200 illustrating a high-level routine for controlling a fuel system, such as the CRS of FIG. 1. The control diagram 200 includes a baseline IMV characteristic curve 202. The baseline IMV characteristic curve 202 includes a plurality of IMV electrical current values, each as a function of rail pressure of the common fuel rail. In other words, the baseline IMV characteristic curve includes an IMV electrical current for each of a plurality of rail pressures. The baseline IMV characteristic curve may be compiled based on test data for a new IMV and other new fuel system components. As such, while the baseline IMV characteristic curve may provide an accurate IMV electrical current to be supplied to the IMV to reach a given rail pressure when the IMV and other fuel system components are new, the baseline IMV characteristic curve may lose accuracy over time as the fuel system components age. As such, over time, more or less fuel may be provided to the fuel rail than desired, compromising engine performance, fuel economy, and/or emissions. Further, in some engine configurations (e.g., large engines having multiple cylinders) more than one high pressure pump and IMV may be used (such as one high-pressure pump and IMV per cylinder bank). In such cases, the routines described herein may be used to assess performance of each IMV relative to each other and each pump relative to each other. Knowledge of this variation (within range) may establish normal/healthy operation of the engine/fuel system, etc.

Thus, the baseline IMV characteristic curve may be updated with a pre-firing correction 204. The pre-firing correction may be determined during conditions where the engine is rotated at a constant speed but fuel injection is not occurring (such as during an engine start where the engine is cranked by a starter motor and before fuel injection commences). The pre-firing correction may include a difference between an amount of electrical current actually supplied to the IMV to reach a given rail pressure and the value of the electrical current for that rail pressure in the baseline IMV characteristic curve. The pre-firing correction may isolate components upstream of the fuel injectors due to the pre-firing correction being determined without fuel injection occurring, and as such may be indicative of an age or level of performance of the IMV, high-pressure fuel pump, battery, and/or harness connecting the battery to the IMV.

Figure 3:
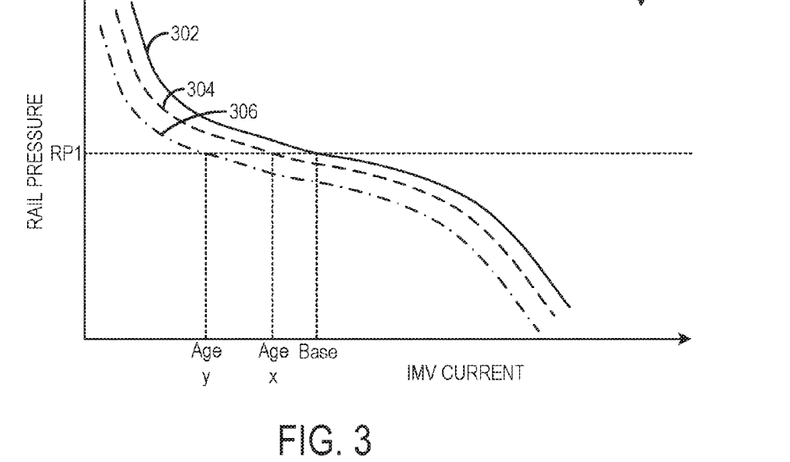
FIGS. 3 and 4 are example diagrams of valve electrical current as a function of common rail fuel system operating conditions.

FIG. 3 illustrates an example plot 300 of pre-firing IMV characteristic curves. Curve 302 is a baseline curve that shows rail pressure as a function of IMV current for a new IMV/fuel system. Curve 304 is an adjusted curve that shows rail pressure as a function of IMV current for an IMV/fuel system of age x, and curve 306 is an adjusted curve that shows rail pressure as a function of IMV current for an IMV/fuel system of age y, where y is older than x. As appreciated by FIG. 3, as the age of the IMV/fuel system increases, the IMV current that is supplied to reach a given rail pressure (e.g., RP1) decreases. The difference between the IMV current to reach RP1 for the baseline curve and for age x may be an example of the pre-firing correction 204 of FIG. 2. A respective pre-firing correction may be determined for each rail pressure value of a plurality of rail pressures.

Returning to FIG. 2, the pre-firing correction 204 is added to the baseline IMV curve at 206 to reach a reference IMV current. The reference IMV current is then updated with a firing correction 208. The firing correction may be determined during engine operation where fuel injection is occurring. The firing correction may include a difference between an amount of electrical current actually supplied to the IMV to reach a given rail pressure (at a given engine operating point) and the value of the electrical current for that rail pressure in a baseline (firing) IMV characteristic curve. The firing correction may account for the fuel injectors due to the firing correction being determined with fuel injection occurring, and as such, when included with the pre-firing correction, may be indicative of an age or level of performance of the fuel injectors.

Figure 4:
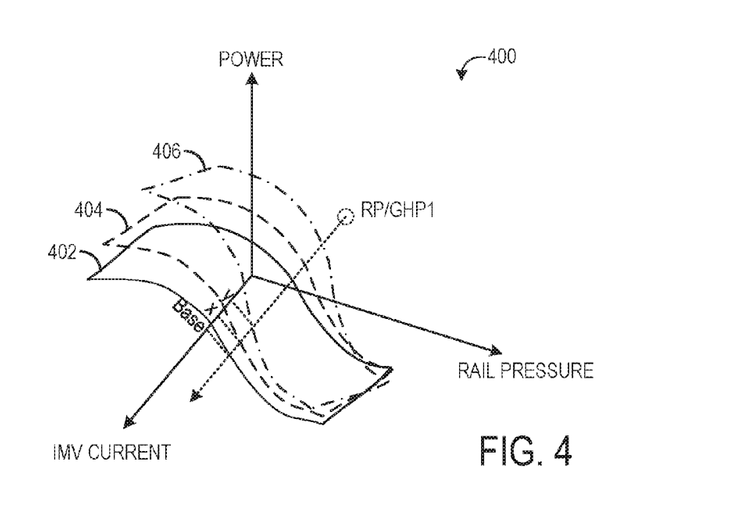

FIG. 4 illustrates an example plot 400 of firing IMV characteristic curves. Curve 402 is a baseline curve that shows rail pressure as a function of IMV current and as a function of engine operation (e.g., engine power) for a new IMV/fuel system. Curve 404 is an adjusted curve that shows rail pressure as a function of IMV current and as a function of engine power for an IMV/fuel system of age x, and curve 406 is an adjusted curve that shows rail pressure as a function of IMV current and as a function of engine power for an IMV/fuel system of age y, where y is older than x. As appreciated by FIG. 4, as the age of the IMV/fuel system increases, the IMV current that is supplied to reach a given rail pressure at a given engine power (e.g., RP/GHP1) decreases. The difference between the IMV current to reach RP/GHP1 for the baseline curve and for age x may be an example of the firing correction 208 of FIG. 2. A respective firing correction may be determined for each operating point of a plurality of operating points. The curves illustrated in FIG. 4 are for a given steady state engine speed and there will be similar maps for other speed points.

Returning to FIG. 2, the firing correction 208 is added to the reference IMV current at 210 to reach a final expected IMV current 212. During a leak test, actual IMV current may be compared to the final expected IMV current, and if the final expected IMV current is higher than the actual IMV current, a leak in the fuel system may be indicated. It is to be understood that this directionality applies to systems where the IMV has a fully open default position such that increasing IMV current results in an increasing level of closure of the IMV and thus the lower the IMV current, the higher the opening of the IMV is and the higher the fuel flow into the high-pressure pump. A higher fuel flow than expected is indicative of a leak in the system. In other configurations where the IMV is a normally-closed valve, the opposite would apply, where a leak may be indicated when the final expected IMV current is lower than the actual IMV current.

Turning to FIG. 5, a method 500 for determining a pre-firing correction factor is presented. Method 500 may be carried out according to non-transitory instructions stored in memory of and executed by a processor of a controller, such as controller 106 of FIG. 1, in order to determine a pre-firing correction factor indicative of an age of an IMV (such as IMV 112) or a high-pressure fuel pump (such as pump 108).

At 502, method 500 includes determining operating parameters. The determined operating parameters include but are not limited to sensed or estimated engine speed, fuel injection status, and IMV position. At 504, method 500 includes determining if the engine is rotating without fuel injection occurring, based on the parameters determined above. As explained previously, the engine may be rotating without fuel injection occurring during an engine start before fuel injection commences, or during other conditions such as dynamic braking where fuel injection is not needed to meet an engine load/operation.

If the engine is not rotating without fuel injection, for example if the engine is stopped or if the engine is operating under fuel injection conditions, method 500 returns. If the engine is rotating without fuel injection, method 500 proceeds to 506 to record a first IMV current supplied to the IMV to reach a first target rail pressure (RP). The first target RP may be any suitable rail pressure above atmospheric pressure that indicates at least some fuel is in the fuel rail, or the first target RP may be a particular rail pressure that is most likely to exhibit IMV age-related changes (e.g., a RP in the middle between atmospheric pressure and maximum rail pressure, or a RP predicted to be achieved during a linear range of the IMV). At 508, method 500 determines a difference between the first IMV current and a base IMV current, where the base IMV current is the current predicted to be supplied to the IMV to reach the first target RP. The base IMV current may be obtained from a fuel system characteristic map, such as the baseline curve 302 of FIG. 3.

At 510, method 500 determines if the difference is greater than a threshold difference. The threshold difference may be a suitable difference below which is attributable to aging of the IMV or high-pressure pump and above which indicates a change in performance (e.g., degradation or leak) of the IMV or high-pressure fuel pump. If the difference is greater than the threshold, method 500 proceeds to 512 to set a degradation condition. In one example, the degradation condition may be set responsive to the first IMV current being more than 5-10% different than the base IMV current. Setting the degradation condition may include notifying an operator via a visual or audio notification and/or setting a diagnostic code to aid in future maintenance. In some examples, setting the degradation condition may include adjusting operating parameters, as indicated at 514. The adjusted operating parameters may include adjusting fuel injection parameters (e.g., longer duration of fuel injection to account for an under-pressured fuel rail if the high-pressure pump is experiencing a leak-back), shutting down the engine, deration of engine power, or other suitable adjustments. Method 500 then ends.

If the difference is not larger than the threshold, method 500 proceeds to 516 to update the pre-firing characteristic map. In some examples, the baseline IMV current for the first target RP may be updated to be equal to the actual supplied IMV current. In other examples, the baseline IMV current may be adjusted by an amount based on the actual supplied IMV current (e.g., adjusted by a factor of the actual supplied IMV current). In still further examples, the baseline IMV current may be maintained at its current value, but an offset or correction factor may be stored in memory with the baseline IMV current. Other mechanisms for updating the pre-firing map are possible.

At 518, method 500 includes repeating the process described above for a plurality of additional target RPs. As such, the amount of current supplied to the IMV may be adjusted until a subsequent target RP is reached, and this amount of current may be compared to the current from the baseline IMV map for the subsequent target RP, and if the difference is less than a threshold, this current value in the pre-firing map may be updated, and so forth until all values in the pre-firing map are updated.

At 520, method 500 optionally includes adjusting one or more operating parameters based on an age of the IMV and/or high-pressure fuel pump as determined from a change in the pre-firing correction factor over time. For example, each pre-firing correction factor for each target RP (or a single pre-firing correction factor reflective of the difference between the actual supplied IMV current for all RPs collectively) may be monitored over time. If the pre-firing correction factor shows an increasing trend, for example if the pre-firing correction factor is increasing at a rate above a threshold rate, it may indicate the IMV or the high-pressure pump is aging. Based on the age of the IMV or pump, various parameters may be adjusted, such as commanded rail pressure, IMV position, fuel injection parameters, or other parameters. Further, when the IMV or high-pressure pump reaches a threshold age, a notification to perform proactive maintenance may be output. Method 500 then ends.

FIG. 6 shows a method 600 for determining a firing correction factor. Method 600 may be carried out according to non-transitory instructions stored in memory of and executed by a processor of a controller, such as controller 106 of FIG. 1, in order to determine a firing correction factor indicative of an age of a fuel injection system (such as fuel injectors 118).

At 602, method 600 includes determining operating parameters. The determined operating parameters include but are not limited to sensed or estimated engine speed, fuel injection status, and IMV position. At 604, method 600 includes determining if the engine is operating at steady state conditions with engine power, speed, and rail pressure each within a given range. In one example, steady state conditions may include engine speed staying within +/−15 RPM with rail pressure at +/−15% of a target rail pressure associated with that engine speed.

If the engine is not operating at steady state conditions with speed, power, and rail pressure in range, for example if the engine speed and power are increasing, method 600 returns. If the engine is operating at steady state conditions with speed, power, and rail pressure in range, method 600 proceeds to 606 to record a first IMV current supplied to the IMV at a first power/speed/rail pressure (GHP/RPM/RP) point. The first GHP/RPM/RP point may be any suitable operating point that indicates at least some fuel is in the fuel rail, or the first operating point may be a particular operating point that is most likely to exhibit age-related changes (e.g., a RP in the middle between atmospheric pressure and maximum rail pressure, or a RP predicted to be achieved during a linear range of the IMV). At 608, method 600 determines a difference between the first IMV current and a reference IMV current, where the reference IMV current is a base IMV current (e.g., the current predicted to be supplied to the IMV to reach the RP at that GHP/RPM operating point) plus the pre-firing correction factor determined as described above with respect to FIG. 5. The base IMV current may be obtained from a fuel system characteristic map, such as the baseline curve 402 of FIG. 4. At 610, method 600 determines if the difference is greater than a threshold difference. The threshold difference may be a suitable difference, where differences below the threshold may be attributable to aging of the fuel injectors and differences above the threshold may indicate a change in performance (e.g., degradation or interpreted leak) of the fuel injectors. In one example, the difference may be determined to be greater than the threshold when the first IMV current is more than 5-10% different than the reference IMV current. If the difference is greater than the threshold, method 600 proceeds to 612 to indicate a possible fuel leak and perform additional confirming tests. In one example, to confirm that a fuel leak is present, output from one or more optical sensors may be analyzed, as indicated at 614. The optical sensors may be positioned to visually detect the flow or collection of fuel out of the injectors/rail and back to the fuel tank, for example. If the output from the one or more optical sensors confirms a leak, an operator may be notified and/or the engine may be shutdown, as described in more detail below. If the output from the optical sensor does not confirm a leak, the original leak determination (based on the IMV current) may be repeated.

In another example, a leak may be confirmed by running a rail pressure decay test, as indicated at 616. During the rail pressure decay test, the fuel rail may be pressurized to a predetermined rail pressure during no fuel injection conditions and the IMV may be closed. The pressure in the fuel rail may be monitored over time and if the pressure decreases at a rate greater than a threshold rate, it may indicate fuel is leaking. If the rail pressure decay test confirms a leak, an operator may be notified and/or the engine may be shutdown, as described in more detail below. If the rail pressure decay test does not confirm a leak, the original leak determination (based on the IMV current) may be repeated.

Once a leak is confirmed, method 600 proceeds to 618 to set a degradation condition. Setting the degradation condition may include notifying an operator via a visual or audio notification and/or setting a diagnostic code to aid in future maintenance. In some examples, setting the degradation condition may include adjusting operating parameters, as indicated at 620. The adjusted operating parameters may include adjusting fuel injection parameters, shutting down the engine, deration of engine power, or other suitable adjustments. Method 600 then ends.

Returning to 610, if it is determined that the difference is not larger than the threshold, method 600 proceeds to 622 to update the firing characteristic map. In some examples, the baseline IMV current stored in the map for the first GHP/RPM/RP point may be updated to be equal to the actual supplied IMV current. In other examples, the baseline IMV current may be adjusted by an amount based on the actual supplied IMV current (e.g., adjusted by a factor of the actual supplied IMV current). In still further examples, the baseline IMV current may be maintained at its current value, but an offset or correction factor may be stored in memory with the baseline IMV current. Other mechanisms for updating the firing map are possible.

At 624, method 600 includes using the final expected IMV current (e.g., the base IMV current plus pre-firing correction plus firing correction) in downstream controls, such as control of rail pressure, IMV current-based leak tests, and/or other controls. Additional detail regarding the use of the final expected IMV current in downstream controls will be presented below with respect to FIG. 7.

At 626, method 600 includes repeating the process described above for a plurality of additional GHP/RPM/RP operating points. As such, the amount of current supplied to the IMV may be adjusted until a subsequent target RP is reached, and this amount of current may be compared to the current from the baseline IMV map for the subsequent target RP, and if the difference is less than a threshold, this current value in the firing map may be updated, and so forth until all values in the firing map are updated.

At 628, method 600 optionally includes adjusting one or more operating parameters based on an age of the fuel injectors as determined from a change in the firing correction factor over time. For example, each firing correction factor for each GHP/RPM/RP (or a single pre-firing correction factor reflective of the difference between the actual supplied IMV current for operating points collectively) may be monitored over time. If the firing correction factor shows an increasing trend, for example if the firing correction factor is increasing at a rate above a threshold rate, it may indicate the fuel injectors are aging. Based on the age of the fuel injectors, various parameters may be adjusted, such as fuel injection duration, rail pressure, fuel injection timing, etc. Further, when the injectors reach a threshold age, a notification to perform proactive maintenance may be output. Method 600 then ends.

Thus, method 600 provides for detecting leaks and/or aging of fuel injectors and makes various adjustments in response to detecting the leaks/aging. With increasing age of an injector, the internal leakage of the injector increases and more fuel is returned back to the tank. This increased leak can eventually result in lower injected fuel quantities, which may be compensated for or corrected by a change in IMV current via the firing correction. With increasing age of an injector and fuel nozzle wear, injected fuel quantity decreases, which may also be compensated for or corrected by another change in IMV current via an additional firing correction. Over time, these individual firing corrections will be combined (added) to obtain the overall firing correction used to deliver the commanded engine power output.

The base IMV current map defines a relationship between rail pressure and IMV current for a fixed speed of the high-pressure pump, which is a function of the engine speed. On an actively fueling engine, the IMV current is further affected by the power being produced (as fuel consumption tends to reduce the rail pressure and the IMV has to compensate for it), and the speed of engine, which will be steady, will be a different value than the base IMV map. This leads to an IMV current map dependent on RP, GHP, and RPM. The outcome of all the maps referenced in the disclosure is an IMV current, with the factors affecting the IMV current changing based on the engine operating mode.

FIG. 7 is a method 700 for controlling a fuel system, such as the CRS 100 of FIG. 1. Method 700 may be carried out according to non-transitory instructions stored in memory of and executed by a processor of a controller, such as controller 106 of FIG. 1. At 702, method 700 includes determining operating parameters. The determined operating parameters may be sensed or estimated, and may include engine speed, engine power, fuel injection status, rail pressure, and so forth. At 704, method 700 includes maintaining a commanded rail pressure by adjusting IMV position based on operating conditions and further based on a corrected IMV current. For example, if the engine is in the process of starting and the fuel rail is being pressurized to its initial pressure prior to commencement of fuel injection, the controller may retrieve a corrected IMV current for reaching a target rail pressure from the pre-firing map described above with respect to FIG. 5 and illustrated in FIG. 3. As explained previously, the pre-firing map may include pre-firing correction factors that correct base IMV currents determined based on a new IMV to account for aging of the IMV and/or high-pressure fuel pump. The controller may then supply the IMV with the corrected amount of current. In this way, the amount of current actually needed to reach a target rail pressure may be supplied to the IMV rather than simply providing a predetermined IMV current.

In another example, if the engine is operating with fuel injection occurring, the controller may retrieve a corrected IMV current for reaching a target rail pressure at the current engine speed and engine power from the firing map described above with respect to FIG. 6 and illustrated in FIG. 4. As explained previously, the firing map may include firing correction factors that correct base IMV currents determined based on a new IMV to account for aging of the injectors. The controller may then supply the IMV with the corrected amount of current. In this way, the amount of current actually needed to reach a target rail pressure may be supplied to the IMV rather than simply providing a predetermined IMV current.

At 706, method 700 determines if a flow-based leak test is indicated. The flow-based leak test may compare a predicted amount of fuel flow into the fuel rail to an actual amount of fuel flow into the rail, where the predicted and actual amounts of fuel flow are approximated based on IMV position and hence based on IMV current. For example, the predicted amount of fuel flow may be based on operating conditions (e.g., fuel injection amounts based on engine speed and load) and a predicted IMV position/current may be associated with the amount of fuel flow. The actual amount of fuel flow is determined based on the actual supplied IMV current. The flow-based leak test may be performed during an engine start, during steady state operating conditions, and/or other suitable conditions. Further, the flow-based leak test may be performed continuously or periodically, such as once every threshold amount of time, miles, mega-watt hours, engine cycles, etc.

If the flow-based leak test is not indicated, method 700 returns. If performance of the flow-based leak test is indicated, method 700 proceeds to 708 to determine the supplied IMV current at a designated GHP/RPM/RP operating point. At 710, method 700 determines if the supplied IMV current is greater than a threshold current. The threshold current may be the final expected IMV current 212 described above with respect to FIG. 2 and determined at 624 of method 600, for the designated GHP/RPM/RP operating point. In some examples, the supplied current may be determined to be greater than the threshold only when the supplied current is greater than the threshold by a specified amount, such as 10% greater than the threshold. If the supplied current is not greater than the threshold, method 700 proceeds to 712 to indicate that no leak is present (in which case the operations of 716, see below, are not carried out), and then method 700 returns.

If the supplied current is greater than the threshold, method 700 proceeds to 714 to determine if the optical sensor indicates a leak. As described previously, the optical sensor may be positioned to detect a leak of a fuel injector or the fuel rail, and thus may provide a confirmation that the leak identified at 710 is actually a leak and a false positive result. Thus, if the optical sensor does not indicate a leak, method 700 proceeds to 712 to indicate that a leak is not present. However, the optical sensor may only be able to confirm leaks in certain locations of the fuel system, and as such in some examples, if the optical sensor does not confirm a leak it may be determined that the leak is located in a different location of the fuel system than where the optical sensor is positioned. As shown in FIGS. 7 (702 to 710) the use of the pre-firing and firing correction factors correct fuel leaks that are "internal" to the IMV, the high pressure fuel pump, and injectors. Whereas, "external" fuel leaks that result from leaks from high pressure fuel pipes (such as high pressure fuel rail, pipes connecting high pressure fuel rail to individual injectors often referred to as jumper tubes) and connectors/fittings at the ends of these high pressure fuel pipes are identified and quantified through the use of optical sensor.

If the optical sensor does indicate a leak, method 700 proceeds to 716 to set a degradation condition and in some examples adjust operating parameters, similar to the degradation condition and adjustments described above with respect to FIGS. 5 and 6. Method 700 then returns. Setting a degraded condition may include setting a diagnostic code to indicate the degradation stored in memory of the controller, and/or the controller generating a message sent to a recipient or displayed on a display coupled to the controller in or exterior to the vehicle.

An embodiment relates to a fuel system. The fuel system includes a low-pressure fuel pump operable to pump fuel from a fuel source at a first pressure; a high-pressure fuel pump operable to increase the first pressure to a second pressure; a valve positioned between the low-pressure fuel pump and the high-pressure fuel pump, the valve being operable to control fuel flow to the high-pressure fuel pump; a common fuel rail fluidly coupling the high-pressure fuel pump to a plurality of fuel injectors that is operable to inject fuel to cylinders of an engine; and a controller operable to adjust an amount of valve electrical current supplied to the valve to reach a commanded pressure of the common fuel rail during cylinder firing conditions, the supplied valve electrical current adjusted based on a valve pre-firing correction factor for the valve obtained based on valve electrical current prior to cylinder firing commencing.

In an example, the controller is operable to obtain the pre-firing correction factor by opening the valve until a pre-firing pressure of the common fuel rail is reached; measuring valve electrical current at the pre-firing pressure; determining a first difference between the measured valve electrical current and a predicted valve electrical current, the predicted valve electrical current indicative of a predicted amount of valve electrical current to be supplied to the valve to reach the pre-firing pressure; and setting the valve pre-firing correction factor as the first difference. The controller may be operable to obtain the pre-firing correction factor during an engine start while the engine is rotating but no fuel injection is occurring. The controller may be operable to indicate a change in performance of one or more of the valve or high-pressure fuel pump if the first difference is greater than a threshold difference.

In an example, the controller is operable to, during cylinder firing conditions that include steady state engine operation at a given engine speed, given engine power, and given pressure of the common fuel rail, obtain a valve firing correction factor. To obtain the valve firing correction factor, the controller is operable to measure the valve electrical current at the given engine speed, given engine power, and given pressure; determine a second difference between the measured valve electrical current and a predicted valve electrical current, the predicted valve electrical current defining an amount of valve electrical current predicted to be supplied to the valve to reach the given pressure at the given engine speed; and set the valve firing correction factor as the second difference. The controller may be operable to further adjust the amount of valve electrical current supplied to the valve to reach the commanded pressure based on the valve firing correction factor. In an example, the controller is operable to indicate a change in performance of the fuel system responsive to the second difference being greater than a threshold difference. The controller may be operable to adjust one or more engine operating parameters in response to the indication of the change in performance. The one or more engine operating parameters may include an amount of electrical current supplied to the IMV, fuel injection parameters (e.g., start and/or end of injection timing), engine power, and so forth.

The fuel system may further include an optical sensor positioned to detect a quantity of fuel. The optical sensor may be positioned in a collection tank, where the collection tank is configured to collect fuel that leaks from the common fuel rail and/or injectors. The controller is operable to indicate the change in performance responsive to output from the optical sensor. For example, if the optical sensor output indicates fuel has reached a threshold level in the collection tank, the change in performance may be indicated. In some examples, the output from the optical sensor may only be analyzed responsive to an initial indication of the change in performance, e.g., based on the firing correction factor. In this way, the output from the optical sensor may be used to confirm the leak detection indicated by analyzing the valve electrical current.

Another embodiment relates to method for a fuel system for an engine. The method includes during a no-load condition of the engine while the engine is rotating, determining a first correction factor indicative of a difference between a first predicted position of a valve and a first measured position of the valve, the valve being operable to control fuel flow to a fuel pump that pumps fuel to a common fuel rail of the engine; during steady state engine operation, determining a second correction factor indicative of a difference between a second predicted position of the valve and a second measured position of the valve, the second predicted position of the valve based on the first correction factor; and responsive to an indication to perform a fuel system test, indicating a change in performance of the fuel system based on a difference between a third measured position of the valve and a threshold position, the threshold position based on both the first correction factor and second correction factor.

The method may further include determining an age of the valve based on a rate of change of the first correction factor over a duration. The method may further include determining an age of one or more fuel injectors of the engine based on a rate of change of the second correction factor over a duration. The method may further include adjusting one or more engine operating parameters responsive to the change in performance of the fuel system.

An embodiment of a method for a fuel system for an engine is provided. The fuel system includes a valve operable to control fuel flow to a fuel pump that pumps fuel to a common fuel rail of the engine. The method includes indicating a change in performance in the fuel system responsive to valve electrical current of the valve differing from a corrected valve electrical current threshold by more than a threshold amount, the corrected valve electrical current threshold including a base valve electrical current corrected with a first, pre-firing correction factor indicative of valve and/or fuel pump age and a second, firing correction factor indicative of fuel injector age.

The method may further include correcting the base valve electric current with the first, pre-firing correction factor by opening the valve until a pre-firing pressure of the common fuel rail is reached, measuring valve electrical current at the pre-firing pressure, determining a first difference between the measured valve electrical current and the base valve electrical current, and correcting the base valve electrical current based on the first difference to reach a reference valve electrical current. In an example, correcting the base valve electric current with the first, pre-firing correction factor comprises correcting the base valve electric current with the first, pre-firing correction factor during an engine start while the engine is rotating but no fuel injection is occurring.

The method may further include correcting the reference valve electrical current with the second, firing correction factor by measuring the valve electrical current at a given engine speed and given pressure of the common fuel rail; determining a second difference between the measured valve electrical current at the given engine speed and given pressure and the reference valve electrical current, and correcting the reference valve electrical current based on the second difference to reach the corrected valve electrical current threshold. In an example, correcting the reference valve electrical current with the second, firing correction factor comprises correcting the reference valve electrical current with the second, firing correction factor during cylinder firing conditions that include steady state engine operation at the given engine speed and the given pressure of the common fuel rail. The method may further include adjusting one or more engine operating parameters responsive to the change in performance of the fuel system.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A fuel system, comprising:
   a low-pressure fuel pump operable to pump fuel from a fuel source at a first pressure;
   a high-pressure fuel pump operable to increase the first pressure to a second pressure;
   a valve positioned between the low-pressure fuel pump and the high-pressure fuel pump, the valve being operable to control fuel flow to the high-pressure fuel pump;
   a common fuel rail fluidly coupling the high-pressure fuel pump to a plurality of fuel injectors that is operable to inject fuel to cylinders of an engine; and
   a controller operable to:
      adjust an amount of valve electrical current supplied to the valve to reach a commanded pressure of the common fuel rail during cylinder firing conditions, the supplied valve electrical current adjusted based on a valve pre-firing correction factor for the valve obtained based on valve electrical current prior to cylinder firing commencing; and
      further adjust the amount of valve electrical current supplied to the valve to reach the commanded pressure based on a valve firing correction factor, the valve firing correction factor based on valve electrical current during cylinder firing conditions.

2. The fuel system of claim 1, wherein the controller is operable to obtain the valve pre-firing correction factor by:
   opening the valve until a pre-firing pressure of the common fuel rail is reached;
   measuring the valve electrical current at the pre-firing pressure;
   determining a first difference between the measured valve electrical current and a predicted valve electrical current, the predicted valve electrical current indicative of a predicted amount of valve electrical current to be supplied to the valve to reach the pre-firing pressure; and
   setting the valve pre-firing correction factor as the first difference.

3. The fuel system of claim 2, wherein the controller is operable to obtain the pre-firing correction factor during an engine start while the engine is rotating but no fuel injection is occurring.

4. The fuel system of claim 2, wherein the controller is operable to indicate a change in performance of one or more of the valve or high-pressure fuel pump if the first difference is greater than a threshold difference.

5. The fuel system of claim 2, wherein the controller is operable to obtain the valve firing correction factor during steady state engine operation at a given engine speed, a given engine power, and a given pressure of the common fuel rail.

6. The fuel system of claim 5, wherein to obtain the valve firing correction factor, the controller is operable to:
   measure the valve electrical current at the given engine speed, the given engine power, and the given pressure;
   determine a second difference between the measured valve electrical current and the predicted valve electrical current, the predicted valve electrical current defining an amount of valve electrical current predicted to be supplied to the valve to reach the given pressure at the given engine speed; and
   set the valve firing correction factor as the second difference.

7. The fuel system of claim 6, wherein the controller is operable to indicate a change in performance of the fuel system responsive to the second difference being greater than a threshold difference.

8. The fuel system of claim 7, wherein the controller is operable to adjust one or more engine operating parameters in response to the indication of the change in performance.

9. The fuel system of claim 7, further comprising an optical sensor positioned to detect a quantity of fuel, wherein the controller is operable to indicate the change in performance responsive to output from the optical sensor.

10. A method for a fuel system for an engine, comprising:
    during a no-load condition of the engine while the engine is rotating, determining a first correction factor indicative of a difference between a first predicted position of a valve and a first measured position of the valve, the valve being operable to control fuel flow to a fuel pump that pumps fuel to a common fuel rail of the engine;
    during steady state engine operation, determining a second correction factor indicative of a difference between a second predicted position of the valve and a second measured position of the valve, the second predicted position of the valve based on the first correction factor;
    responsive to an indication to perform a fuel system test, indicating a change in performance of the fuel system based on a difference between a third measured position of the valve and a threshold position, the threshold position based on both the first correction factor and second correction factor; and
    adjusting one or more engine operating parameters responsive to the change in performance of the fuel system.

11. The method of claim 10, further comprising determining an age of the valve based on a rate of change of the first correction factor over a duration.

12. The method of claim 10, further comprising determining an age of one or more fuel injectors of the engine based on a rate of change of the second correction factor over a duration.

13. A method for a fuel system for an engine, the fuel system including a valve operable to control fuel flow to a fuel pump that pumps fuel to a common fuel rail of the engine, the method comprising:
    indicating a change in performance in the fuel system responsive to valve electrical current of the valve differing from a corrected valve electrical current threshold by more than a threshold amount, the corrected valve electrical current threshold including a base valve electrical current corrected with a first, pre-firing correction factor indicative of valve and/or fuel pump age and a second, firing correction factor indicative of fuel injector age; and adjusting one or more engine operating parameters responsive to the change in performance of the fuel system.

14. The method of claim 13, further comprising correcting the base valve electric current with the first, pre-firing correction factor by opening the valve until a pre-firing pressure of the common fuel rail is reached, measuring valve electrical current at the pre-firing pressure, determining a first difference between the measured valve electrical current and the base valve electrical current, and correcting the base valve electrical current based on the first difference to reach a reference valve electrical current.

15. The method of claim 14, wherein correcting the base valve electric current with the first, pre-firing correction factor comprises correcting the base valve electric current with the first, pre-firing correction factor during an engine start while the engine is rotating but no fuel injection is occurring.

16. The method of claim 14, further comprising correcting the reference valve electrical current with the second, firing correction factor by measuring the valve electrical current at a given engine speed and a given pressure of the common fuel rail; determining a second difference between the measured valve electrical current at the given engine speed and the given pressure and the reference valve electrical current, and correcting the reference valve electrical current based on the second difference to reach the corrected valve electrical current threshold.

17. The method of claim 16, wherein correcting the reference valve electrical current with the second firing correction factor comprises correcting the reference valve electrical current with the second firing correction factor during cylinder firing conditions that include steady state engine operation at the given engine speed and the given pressure of the common fuel rail.

* * * * *